(12) United States Patent
Mattela

(10) Patent No.: US 10,362,509 B2
(45) Date of Patent: Jul. 23, 2019

(54) INCIDENT BROADCAST RETRANSMISSION IN A VEHICULAR NETWORK

(71) Applicant: Redpine Signals, Inc., San Jose, CA (US)

(72) Inventor: Govardhan Mattela, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 20 days.

(21) Appl. No.: 15/656,854

(22) Filed: Jul. 21, 2017

(65) Prior Publication Data

US 2018/0167844 A1 Jun. 14, 2018

Related U.S. Application Data

(60) Provisional application No. 62/432,105, filed on Dec. 9, 2016.

(51) Int. Cl.

| H04L 1/18 | (2006.01) |
|---|---|
| H04W 4/02 | (2018.01) |
| H04W 28/04 | (2009.01) |
| H04W 4/70 | (2018.01) |
| H04W 4/90 | (2018.01) |
| H04W 4/04 | (2009.01) |
| H04W 4/08 | (2009.01) |
| H04W 24/08 | (2009.01) |
| H04L 1/08 | (2006.01) |
| H04W 4/46 | (2018.01) |
| H04L 29/12 | (2006.01) |
| H04W 84/18 | (2009.01) |
| H04L 1/00 | (2006.01) |

(52) U.S. Cl.
CPC ............. *H04W 28/04* (2013.01); *H04L 1/08* (2013.01); *H04L 1/188* (2013.01); *H04L 1/189* (2013.01); *H04W 4/026* (2013.01); *H04W 4/046* (2013.01); *H04W 4/08* (2013.01); *H04W 4/46* (2018.02); *H04W 4/70* (2018.02); *H04W 4/90* (2018.02); *H04W 24/08* (2013.01); *H04L 61/6022* (2013.01); *H04L 2001/0093* (2013.01); *H04W 84/18* (2013.01)

(58) Field of Classification Search
None
See application file for complete search history.

(56) References Cited

U.S. PATENT DOCUMENTS

| 7,877,196 | B2 | 1/2011 | Lin et al. | |
|---|---|---|---|---|
| 8,923,183 | B2 * | 12/2014 | Nagai | G08G 1/163 370/312 |
| 9,503,968 | B2 * | 11/2016 | Nathanson | G07C 5/0808 |
| 9,959,756 | B2 * | 5/2018 | Filley | H04W 4/90 |

(Continued)

FOREIGN PATENT DOCUMENTS

WO 2008/068729 A1 6/2008

*Primary Examiner* — Ajit Patel
(74) *Attorney, Agent, or Firm* — File-EE-Patents.com; Jay A. Chesavage

(57) ABSTRACT

A system for transmission of incident information includes maintaining a table of RSSI values for a plurality of stations. When an incident is detected, the system first sends a broadcast packet with incident information, and next sends a unicast packet to any station below a particular RSSI threshold until the unicast packet is acknowledged or a retransmission interval passes.

18 Claims, 4 Drawing Sheets

WAVE network Incident Reporting

(56) References Cited

U.S. PATENT DOCUMENTS

| | | | |
|---|---|---|---|
| 2005/0002347 A1* | 1/2005 | Lee | G08G 1/0104 |
| | | | 370/312 |
| 2007/0280172 A1 | 12/2007 | Tan et al. | |
| 2011/0034201 A1* | 2/2011 | Hamada | H04L 67/12 |
| | | | 455/517 |
| 2011/0164546 A1 | 7/2011 | Mishra et al. | |
| 2012/0182935 A1 | 7/2012 | Addepalli et al. | |
| 2013/0301584 A1 | 11/2013 | Addepalli et al. | |
| 2015/0264538 A1 | 9/2015 | Klang et al. | |
| 2015/0312883 A1* | 10/2015 | Han | H04H 20/62 |
| | | | 370/328 |
| 2016/0295589 A1* | 10/2016 | Nikopour | H04W 4/023 |
| 2017/0238270 A1* | 8/2017 | Shen | H04J 3/0644 |
| | | | 370/336 |
| 2017/0374601 A1* | 12/2017 | Braga Ameixieira | |
| | | | H04W 40/20 |
| 2018/0324560 A1* | 11/2018 | Xu | H04W 4/06 |

\* cited by examiner

WAVE network Incident Reporting

WAVE network Incident Reporting

WAVE network Incident Reporting

| 102A RSSI Table | 120A RSSI Table | 118A RSSI Table |
|---|---|---|
| 104A:−40dbm | 104A:−40dbm | 104A:−95dbm |
| 106A:−45dbm | 106A:−45dbm | 106A:−90dbm |
| 120A:−45dbm | 102A:−45dbm | 120A:−95dbm |
| 108A:−50dbm | 108A:−50dbm | 108A:−75dbm |
| 122A:−50dbm | 122A:−50dbm | 122A:−80dbm |
| 114A:−55dbm | 114A:−40dbm | 102A:−100dbm |
| 110A:−65dbm | 110A:−45dbm | 114A:−70dbm |
| 116A:−80dbm | 116A:−60dbm | 112A:−40dbm |
| 124A:−80dbm | 124A:−60dbm | 116A:−40dbm |
| 112A:−90dbm | 112A:−70dbm | 124A:−40dbm |
| 118A:−100dbm | 118A:−80dbm | 110A:−50dbm |

WAVE network Incident Reporting

| 102A RSSI Table | 120A RSSI Table | 118A RSSI Table |
|---|---|---|
| 104A:−40dbm(+) | 104A:−40dbm(−) | 104A:−95dbm(+) |
| 106A:−45dbm(+) | 106A:−45dbm(−) | 106A:−90dbm(+) |
| 120A:−45dbm(−) | 102A:−45dbm(−) | 120A:−95dbm(−) |
| 108A:−50dbm(+) | 108A:−50dbm(−) | 108A:−75dbm(+) |
| 122A:−50dbm(−) | 122A:−50dbm(+) | 122A:−80dbm(−) |
| 114A:−55dbm(−) | 114A:−40dbm(+) | 102A:−100dbm(+) |
| 110A:−65dbm(+) | 110A:−45dbm(−) | 114A:−70dbm(−) |
| 116A:−80dbm(−) | 116A:−60dbm(+) | 112A:−40dbm(+) |
| 124A:−80dbm(−) | 124A:−60dbm(+) | 116A:−40dbm(−) |
| 112A:−90dbm(+) | 112A:−70dbm(−) | 124A:−40dbm(−) |
| 118A:−100dbm(+) | 118A:−80dbm(−) | 110A:−50dbm(+) |

RSSI Task

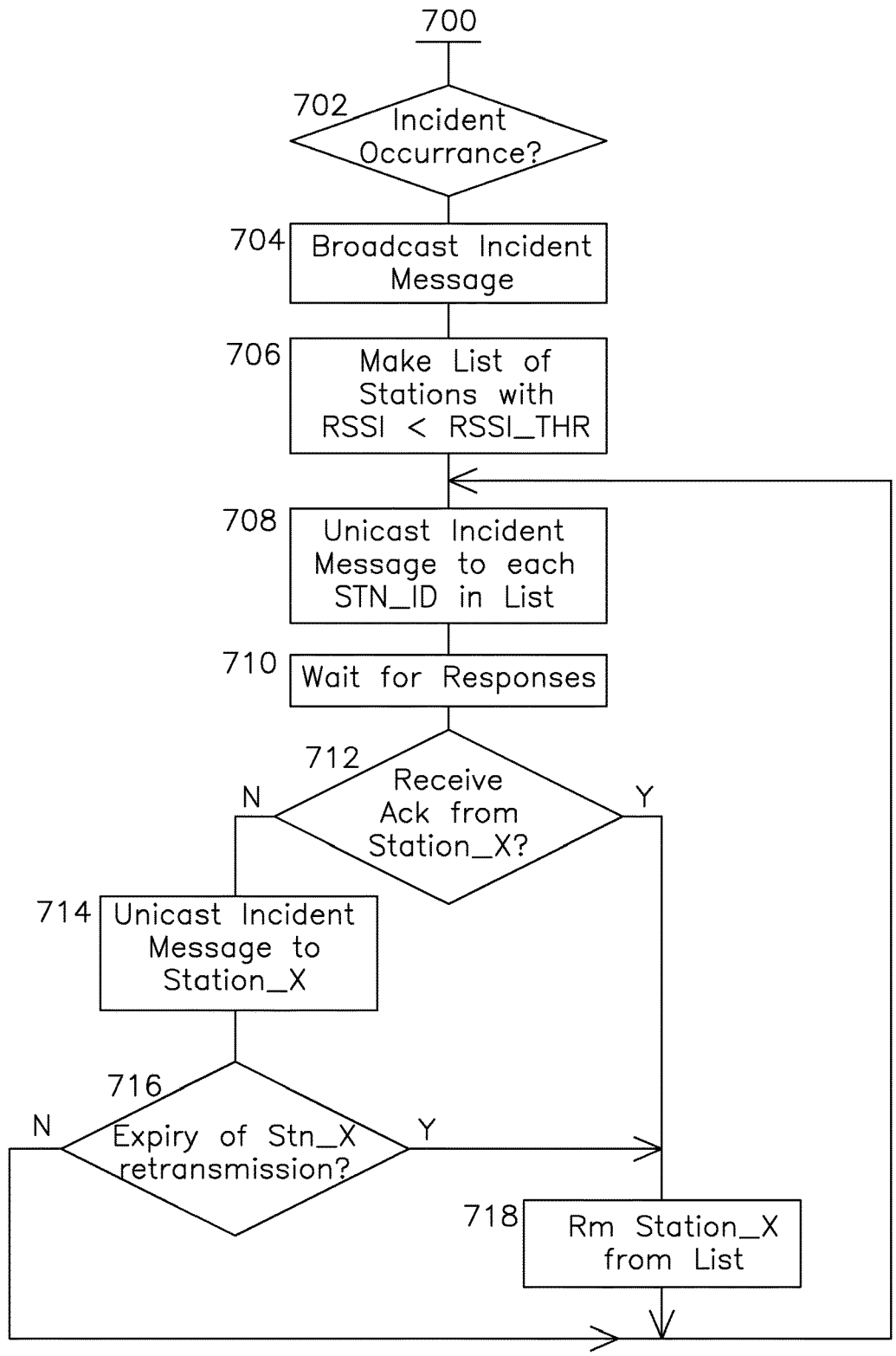

US 10,362,509 B2

INCIDENT BROADCAST RETRANSMISSION IN A VEHICULAR NETWORK

The present patent application claims priority to provisional application Ser. No. 62/432,105 filed Dec. 9, 2016.

FIELD OF THE INVENTION

The present invention relates to vehicular communications. In particular, the invention relates to a method for sending critical message in a Wireless Access for Vehicular Equipment (WAVE) set of wireless On Board Equipment (OBE) devices under IEEE protocol 802.11p.

BACKGROUND OF THE INVENTION

WAVE networks operating under the IEEE 802.11p include the capability to send time-critical messages related to road hazards to other vehicles sharing the roadway. In some environmental conditions, it may not be possible to assure timely delivery of these messages through the WAVE infrastructure. For this reason, it is desired to provide a method for communication of incident messages such that these incident messages reach as many vehicles as possible.

OBJECTS OF THE INVENTION

A first object of the invention is a method for retransmission of critical messages, whereby a transmitting station first sends the critical message using a broadcast message in a first step, and thereafter retransmits the same critical message as a unicast message to identified stations which have a received signal strength indicator (RSSI) below a particular threshold, optionally continuing to retransmit the critical message as a unicast message until the message is acknowledged by stations which were sent the unicast message, or the expiry of a timeout for retransmission attempts.

A second object of the invention is a method for a receiver, the method having a step of measuring the receive signal strength indicator (RSSI) of each nearby station, identifying stations with an RSSI below a threshold, and upon receipt of an incident message, retransmitting the incident message to each station which is below the threshold.

SUMMARY OF THE INVENTION

The present invention provides a process for retransmission of critical messages in a system which each station maintains a periodically updated table of RSSI data for remote stations from which it has received wireless frames, each station having an associated RSSI and optionally a travel direction. When the RSSI for a remote station is detected as being below a particular threshold, the critical message is also transmitted as a unicast packet to that station when a critical hazard is detected for transmission to surrounding stations. Each station maintains a local table of surrounding station identifiers and associated RSSI. Upon detection of a critical hazard, the OBE host sends a broadcast message advising of the hazard, and, for stations with an RSSI below a particular RSSI threshold, follows with a unicast transmission to those stations below the RSSI threshold. The particular RSSI threshold is selected to be indicative of low likelihood of reception of the broadcast by the remote station. Unicast messages continue to be re-transmitted by the local station until each station acknowledges receipt of its respective unicast message, or a retransmission interval expires. Optionally, the unicast message after a broadcast is only sent to stations detected as travelling in the same direction as the sending station which are also below the particular threshold RSSI.

BRIEF DESCRIPTION OF THE DRAWINGS

FIG. 7 shows a flowchart for transmitting an incident message.

DETAILED DESCRIPTION OF THE INVENTION

Figure 1:
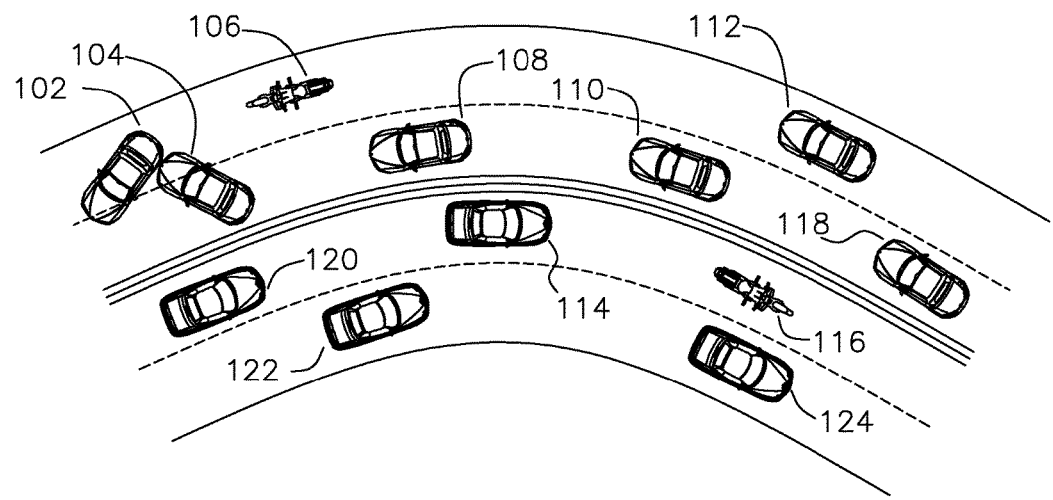
FIG. 1 shows a top view of vehicles on a roadway.

FIG. 1 shows an example of roadway vehicles 102 and 104 which have collided and have stopped in the roadway, with oncoming motorcycle 106 and vehicle 108 which are within a sightline of the accident, and oncoming traffic 110, 112, and 118 which are outside of a sightline of the accident, thereby presenting a hazard to all involved. Vehicles 120, 122, 114, 116, 124 travelling in an opposite direction are not affected by the accident involving vehicles 102 and 104.

Figure 2:
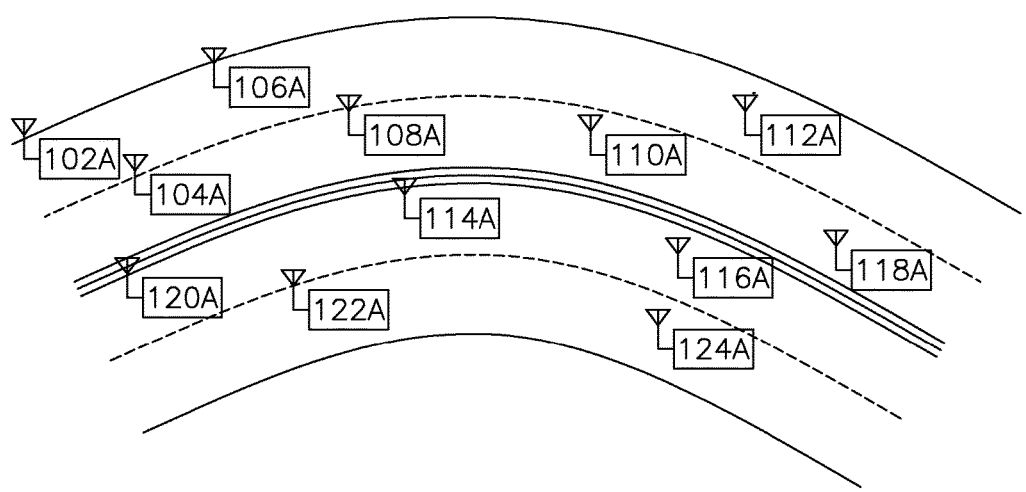
FIG. 2 shows a view of FIG. 1 with wireless OBE stations.
Figures 3, 4:
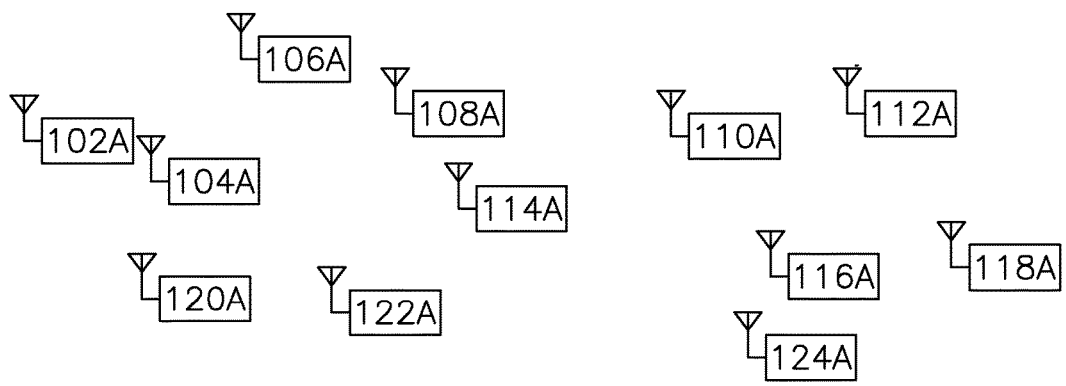
FIG. 3 shows a view of FIG. 2 without a road for reference.
FIG. 4 shows RSSI tables for selected OBE stations of FIGS. 1, 2, and 3.
Figures 5, 6:
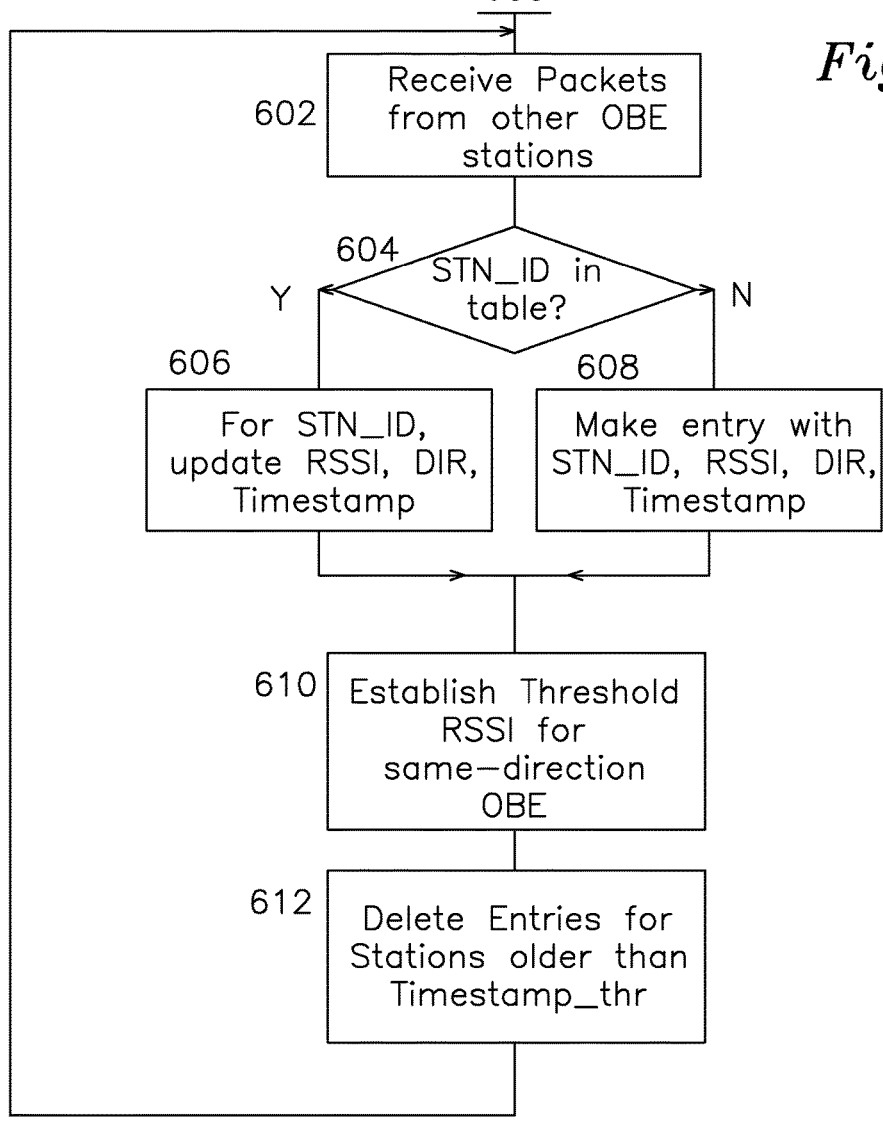
FIG. 5 shows RSSI tables including directional information for the selected stations of FIG. 4.
FIG. 6 shows a flowchart for forming a table of stations and associated RSSI, direction, and timestamp values.

FIG. 2 shows the same vehicles, represented by on board equipment (OBE) wireless stations with corresponding "A" suffix, where the OBE operates according to a WAVE or 802.11p standard. Such OBE equipment may transmit status or incident messages. As a collection of network nodes, the station topology is represented in FIG. 3, without the roadway or direction of movement shown for reference. Each station maintains an RSSI table of received transmissions, as shown in FIG. 4 for station 102A and 118A (moving in one direction, as seen in FIG. 1), with station 120 moving in the opposite direction. An alternative RSSI table is shown in FIG. 5, where the RSSI table for each station also includes a directional indicator, where (+) indicates the station with an associated RSSI is moving in the same direction as the subject station, and a (−) indicates the station is moving in an opposite direction. Such directional information may be estimated by relative frequency offset from Doppler shift of the received carrier signal, or by GPS vector information transmitted by the other station as part of its periodic transmission packet, or by examination of the change in GPS location or RSSI over several time samples of RSSI value for a particular station.

Where an incident occurs, such as the collision between vehicles 102 and 104 of FIG. 1, it is desired to provide an urgent status message to the other OBE equipment which is traveling toward the incident which has a higher likelihood of reception than a single broadcast packet, such that autonomous vehicles receiving the urgent status message may slow down, and surrounding drivers may be alerted of the incident. A broadcast message is the standard mechanism for transmission of such broadly relevant incident information by a detecting OBE, however if a distant station does not receive the broadcast, this failure to receive will not be known to the sender, as 802.11p broadcast messages are sent with a broadcast destination address, and are not acknowledged by the receiving station. In the present invention, the broadcast message to all stations from the detecting OBE is followed by a unicast message which contains the same incident information and content as the incident broadcast packet, but the unicast message is transmitted with a destination address of a particular station and received only by that station. The unicast messages are sent only to the stations with the weakest RSSI, or preferably to stations with an RSSI below a particular RSSI threshold. Unicast messages which are received by surrounding OBE stations are acknowledged with a return ACK packet, and the failure to receive an acknowledgement of the unicast packet with the critical incident information message by the OBE sender results in the retransmission of the unicast message. In this manner, each station maintains a table of RSSI values based on previously received messages, and stations with the weakest RSSI, or those stations below a threshold RSSI value are selected for transmission of a unicast message which contains the incident information of the broadcast packet, and the unicast message is retransmitted until acknowledged, or alternatively upon expiry of a retransmission timer either by number of retransmission attempts or duration of time the retransmissions were attempted.

In a variation of the protocol utilizing the directional information shown in FIG. 5, only stations identified as travelling in the same direction as the reference station are subject to the unicast message transmission. For example, with respect to vehicle 102 and station 102A, which has transmitted a host incident information message upon impact with vehicle 104 of station 104A shown in FIG. 1, vehicles 106, 108, 110, 112, and 118 are determined by examination of the associated remote host GPS data or RSSI data of host 104A as travelling in the same direction, and vehicles 120, 122, 114, 116, and 124 are determined as travelling in the opposite direction as indicated by their corresponding GPS data or RSSI information from the respective entries in the table for OBE host 102A of FIG. 5 which has detected the collision or other critical event requiring notification to surrounding vehicles. After the transmission of the broadcast incident message by OBE host 102A, a series of unicast information messages is transmitted from vehicles 102 (or 104 which may be operating using the same protocol) to each of hosts 108A, 110A, 112A, or 118A which are below the example FIG. 5 threshold RSSI threshold level of −49 dbm.

FIG. 6 shows an RSSI task flowchart, whereby after an entry 600, packets which are received from surrounding OBE stations 602 are examined by station identifier (such as MAC address) in step 604 to determine whether the station identifier is present in a station table such as was described for FIG. 5 102A for station 102. If the station identifier is not present in the table, a new entry is made 608 which includes the station identifier, RSSI, direction (or GPS history indicating whether travelling towards or away from the OBE host) with a timestamp indicating the time the packet was received so that it may be aged out of the table if a particular station has not been heard from. If the station identifier is already present in the table 606, then the RSSI, direction indication, and timestamp are updated 606. In step 610, a threshold RSSI is established for same-direction OBE stations (based on the DIR field for other stations), the threshold RSSI either being a fixed value or a variable value which, in one example of the invention, sets the RSSI threshold to place the weakest 5-20% of the stations by RSSI below the RSSI threshold. Other methods may be used to establish the RSSI threshold. In step 612, entries which are older than, for example, two to ten timestamp events, are deleted from the table, thereby removing vehicles which have not been detected as present by the host vehicle for an appropriate duration of time. After aging entries out of the table 612, the task resumes at step 600, running continuously to provide an updated table of detected OBE hosts.

FIG. 7 shows the incident task which is entered at point 700 when an incident is detected by an OBE station 702. The event may be a collision, mechanical failure, fire, or other event causing hazard to surrounding vehicles. The incident message is broadcast 704 to all stations, and a unicast list of stations 706 is formed with RSSI which falls below the RSSI threshold which was established in step 610 of FIG. 6. Each station (STN_ID) on the unicast list has a unicast incident message transmitted by the OBE station, and after a reply interval 710, each station which acknowledges the unicast incident message by transmitting an acknowledgement is removed from the unicast list 718 based on responding station identifier. If an acknowledgement is not received from a particular station on the unicast list, the unicast message is retransmitted to the non-responsive stations 714 on the unicast list until either an acknowledgement is received 718 or the retransmission timer 716 expires for each particular station on the unicast list, in which case the responding station is removed from the unicast list 718 as non-responsive. The incident message is treated as time-sensitive, so any station which has not responded either after an interval of time or after a certain number of retransmissions is removed from the unicast list 718, thereby ending retransmission of unicast incident messages.

I claim:

1. A method for transmission and acknowledgement of an incident message to a plurality of surrounding moving vehicles, the method operative on an on-board equipment (OBE) station, the method comprising:

upon receipt of a packet from an OBE station where an associated station identifier is not present in the table, adding the station identifier into a station table along with a Receive Signal Strength Indicator (RSSI) indicating the signal strength of a station associated with the station identifier, a timestamp indicating the time a packet from the station associated with the station identifier was received, and optionally a direction, and when an associated station identifier is present in the table, updating an associated RSSI for the station identifier, a timestamp associated with the station identifier, and optionally a direction associated with the station identifier;

determining an RSSI threshold value corresponding to a low likelihood of reception by a remote station in the station table based on RSSI values in the station table;

upon occurrence of an incident to be transmitted to surrounding OBE stations, sending a broadcast message containing the incident information;

thereafter identifying each station in the table which has an RSSI below said RSSI threshold value, initializing a retransmission timer, and sending said each station a unicast transmission containing the incident information until each station having been sent the unicast transmission acknowledges the unicast transmission, or until the retransmission timer expires.

2. The method of claim 1 where said incident message, said received packet, said broadcast transmission, and said unicast transmission is an 802.11p packet.

3. The method of claim 1 where said table of entries includes only stations going in the same direction as the host OBE station.

4. The method of claim 3 where said same direction is determined from either a GPS vector in said message, a change in GPS location from a previously received message, or a change in RSSI value in said message.

5. The method of claim 1 where said sending incident information as a unicast packet includes sending incident information to stations which are below a particular RSSI threshold and also travelling in the same direction as the station sending the incident information.

6. The method of claim 1 where said station identifier is a media access controller (MAC) address.

7. The method of claim 1 where the host OBE initiates the transmission of an incident message based on a collision, fire, mechanical failure or other event effecting surrounding vehicles.

8. The method of claim 1 where the expiration of said retransmission timer occurs after 2 to 10 retransmission attempts without acknowledgement.

9. The method of claim 1 where the RSSI threshold is a fixed value.

10. The method of claim 1 where the RSSI threshold is selected to place 5% to 20% of the stations in the RSSI table below the selected RSSI threshold.

11. A method for retransmission in a vehicular network, each vehicle having an associated on-board equipment (OBE) host and receiving packets from surrounding OBE stations, the method operative on the OBE host and having a Receive Strength Signal Indicator (RSSI) task and an incident task;

the RSSI task operative on a station table having entries, the RSSI task comprising:
  receiving packets from surrounding OBE stations, extracting a station identifier, an associated RSSI, and an optional direction for each associated station identifier;
  when the station identifier is not present in the station table, adding a station table entry having at least the station identifier, the associated RSSI, an optional direction, and a timestamp indicating the time of packet receipt;
  when the station identifier is already present in the station table, updating the associated station table entry with the associated RSSI, an optional direction, and a timestamp indicating the time of packet receipt;
  establishing an RSSI threshold;
the incident task comprising:
  upon detection of an incident, broadcasting an incident message;
  forming an RSSI station list comprising each station in the station table which has an associated RSSI which is below the RSSI threshold;
  transmitting the incident message as a unicast message to each station in the RSSI station list;
  retransmitting the incident message to each station in the RSSI station list until an acknowledgement is received from the associated station, or a retransmission interval elapses.

12. The method of claim 11 where the RSSI task only enters stations into the station table where the station direction is the same as the OBE host direction.

13. The method of claim 11 where the RSSI threshold is a fixed value.

14. The method of claim 11 where the RSSI threshold is selected to place 5% to 20% of the stations below the selected RSSI threshold.

15. The method of claim 11 where the received packets are 802.11p format packets.

16. The method of claim 11 where the retransmission interval is a fixed interval of time.

17. The method of claim 11 where the retransmission interval is a fixed number of retransmission of the unicast incident message to a particular station.

18. The method of claim 17 where the fixed number of retransmissions is between two and ten.

* * * * *